United States Patent
Lyngfelt (10) Patent No.: US 12,427,983 B2
(45) Date of Patent: Sep. 30, 2025

(54) VEHICLE CONTROL SYSTEM

(71) Applicant: QUALCOMM AUTO LTD., Cambridge (GB)

(72) Inventor: Thomas Lyngfelt, Gothenburg (SE)

(73) Assignee: Qualcomm Auto Ltd., San Diego, CA (US)

( * ) Notice: Subject to any disclaimer, the term of this patent is extended or adjusted under 35 U.S.C. 154(b) by 44 days.

(21) Appl. No.: 18/549,416

(22) PCT Filed: Mar. 29, 2022

(86) PCT No.: PCT/EP2022/058281
§ 371 (c)(1),
(2) Date: Sep. 7, 2023

(87) PCT Pub. No.: WO2022/214359
PCT Pub. Date: Oct. 13, 2022

(65) Prior Publication Data
US 2024/0140422 A1 May 2, 2024

(30) Foreign Application Priority Data
Apr. 8, 2021 (EP) ..................... 21167367

(51) Int. Cl.
*B60W 30/16* (2020.01)
*B60W 30/14* (2006.01)
*B60W 50/00* (2006.01)

(52) U.S. Cl.
CPC .......... *B60W 30/16* (2013.01); *B60W 30/143* (2013.01); *B60W 50/00* (2013.01);
(Continued)

(58) Field of Classification Search
CPC .... B60W 30/143; B60W 30/16; B60W 50/00; B60W 50/087; B60W 2050/0026;
(Continued)

(56) References Cited

U.S. PATENT DOCUMENTS

2016/0075332 A1* 3/2016 Edo-Ros ........... B60W 30/0956
  701/70
2019/0232961 A1 8/2019 Baier et al.
(Continued)

FOREIGN PATENT DOCUMENTS

CN  115139999 A  * 10/2022
CN  116863445 A  * 10/2023
(Continued)

OTHER PUBLICATIONS

Baek, et al., "Vehicle Trajectory Prediction and Collision Warning via Fusion of Multisensors and Wireless Vehicular Communications," Sensors (Basel). Jan. 4, 2020;20(1):288. doi: 10.3390/s20010288 (https://pmc.ncbi.nlm.nih.gov/articles/PMC6982806/) (Year: 2020).*

(Continued)

*Primary Examiner* — Atul Trivedi
(74) *Attorney, Agent, or Firm* — Qualcomm Auto Ltd.

(57) ABSTRACT

The present disclosure relates to a vehicle control system (2) comprising a control unit arrangement (3) and at least one sensor arrangement (4, 5) in an ego vehicle (1). The sensor arrangement (4, 5) is adapted to provide sensor information for one preceding target vehicle (6) and surrounding target vehicles (7, 8, 9, 10, 11) separate from the preceding target vehicle (6). The control unit arrangement (3) is adapted to control an ego vehicle speed ($v_1$) in dependence of the sensor information associated with the preceding target vehicle (6) such that an ego distance ($r_1$) between the ego vehicle (1) and the preceding target vehicle (6) is obtained. A time gap ($\Delta T_1$) is defined as the time for travelling the ego distance ($r_1$) at the ego vehicle speed (vi), The control unit arrangement (8) is adapted to control the ego vehicle speed ($V_1$) in dependence of the sensor information associated with the surrounding target vehicles (7, 8, 9, 10, 11) such (Continued)

that a present time gap ($\Delta T_1$) is maintained in dependence of the number of detected surrounding target vehicles (11).

15 Claims, 8 Drawing Sheets

(52) U.S. Cl.
CPC ............... *B60W 2050/0026* (2013.01); *B60W 2050/0083* (2013.01); *B60W 2554/406* (2020.02); *B60W 2554/80* (2020.02)

(58) Field of Classification Search
CPC ..... B60W 2050/0083; B60W 2520/10; B60W 2554/406; B60W 2554/80; B60W 2554/802; B60W 2754/30
USPC .......................................................... 701/96
See application file for complete search history.

(56) References Cited

U.S. PATENT DOCUMENTS

| | | | |
|---|---|---|---|
| 2019/0259283 A1* | 8/2019 | Sung | G01S 13/42 |
| 2020/0339153 A1* | 10/2020 | Zuo | B60W 60/0016 |
| 2020/0342756 A1* | 10/2020 | MacKenzie | B60W 50/0098 |
| 2020/0342760 A1* | 10/2020 | Vassilovski | G05D 1/22 |
| 2021/0009121 A1* | 1/2021 | Oboril | B60W 30/0953 |
| 2021/0024059 A1* | 1/2021 | Miyamoto | B60W 30/095 |
| 2021/0046941 A1* | 2/2021 | Visintainer | G08G 1/096791 |
| 2021/0053561 A1* | 2/2021 | Beller | G08G 1/166 |
| 2021/0055733 A1* | 2/2021 | Beller | G05D 1/0088 |
| 2021/0094577 A1* | 4/2021 | Shalev-Shwartz | B60W 60/001 |
| 2022/0180738 A1* | 6/2022 | Dubner | G08G 1/096775 |
| 2023/0360232 A1* | 11/2023 | Kocamaz | G06T 7/246 |
| 2024/0059326 A1* | 2/2024 | Lee | G08G 1/096725 |
| 2024/0190434 A1* | 6/2024 | Zeiynali Farid | B60W 30/16 |
| 2024/0208540 A1* | 6/2024 | Schaumann | B60W 30/0956 |
| 2024/0217552 A1* | 7/2024 | McCawley | B60W 60/0015 |
| 2024/0239314 A1* | 7/2024 | Inoue | B60T 17/22 |
| 2024/0326841 A1* | 10/2024 | Di Cairano | B60W 50/035 |
| 2025/0102679 A1* | 3/2025 | Braley | B60W 60/001 |

FOREIGN PATENT DOCUMENTS

| | | | | |
|---|---|---|---|---|
| DE | 102013218280 A1 * | 3/2015 | | B60W 30/09 |
| DE | 102023129813 A1 * | 10/2024 | | B60W 50/14 |
| EP | 2658763 A1 | 11/2013 | | |
| EP | 3081447 A1 | 10/2016 | | |
| FR | 3120039 A1 * | 8/2022 | | B60W 30/09 |
| JP | 2022104397 A * | 7/2022 | | B60W 60/0016 |
| JP | 7614563 B2 * | 1/2025 | | B60W 30/09 |
| KR | 20240121532 A * | 8/2024 | | G08G 1/166 |
| WO | WO-2020225634 A1 * | 11/2020 | | B60W 30/0956 |
| WO | 2021018374 A1 | 2/2021 | | |

OTHER PUBLICATIONS

Wei, et al., "Vehicle Frontal Collision Warning System based on Improved Target Tracking and Threat Assessment," 2007 IEEE Intelligent Transportation Systems Conference, Bellevue, WA, USA, 2007, pp. 167-172, doi: 10.1109/ITSC.2007.4357744. (https://ieeexplore.ieee.org/document/4357744) (Year: 2007).*

International Search Report and Written Opinion—PCT/EP2022/058281—ISA/EPO—Jun. 21, 2022.

European Search Report—EP21167367—Search Authority—Munich—Aug. 30, 2021.

* cited by examiner

VEHICLE CONTROL SYSTEM

CROSS-REFERENCE TO RELATED APPLICATIONS

This application is the National Stage of International Application No. PCT/EP2022/058281, filed Mar. 29, 2022, entitled "A VEHICLE CONTROL SYSTEM," which claims the benefit of European Patent Application No. 21167367.8, filed Apr. 8, 2021, entitled "A VEHICLE CONTROL SYSTEM," both of which are assigned to the assignee hereof, and the entire contents of both of which are hereby incorporated herein by reference for all purposes.

The present disclosure relates to a vehicle control system comprising a control unit arrangement and at least one sensor arrangement that is arranged to be mounted in an ego vehicle and is adapted to provide sensor information for one preceding target vehicle and surrounding target vehicles.

Many vehicles comprise environmental detection systems such as radar, Lidar and camera systems which are arranged for object detection, being able to provide a warning to a driver about an object in the path of a vehicle, as well as providing input to vehicle systems such as Adaptive Cruise Control (ACC) and Rear Cross Traffic Avoidance (RCTA) systems, where ACC is a longitudinal distance controller in an ADAS (Advanced Driver Assistant System).

Such environmental detection systems can comprise one or more forward-looking detectors, rearward-looking detectors and sideward-looking detectors of one or more types. Other types of detectors include V2V (vehicle-to-vehicle) and V2X (vehicle-to-anything).

ACC aims to mimic the behavior of a human driver, which represents huge challenges regarding controller design as well as regarding calculation of a desired distance to surrounding objects. The desired distance can be defined as a time gap, which is a time that corresponds to a distance to a preceding object.

U.S. Pat. No. 6,805,216 discloses an ACC system adapted to adjust distance or speed to the vehicle in front dependent on average distance to vehicles in adjacent lanes.

A more accurate mimic of human behavior is, however, desired.

The object of the present disclosure is to provide a vehicle control system that is adapted to adjust distance or speed to the vehicle in front in such a way that a more accurate mimic of human behavior than previously known is obtained in an uncomplicated and reliable manner.

This object is obtained by means of a vehicle control system comprising a control unit arrangement and at least one sensor arrangement that is arranged to be mounted in an ego vehicle. The sensor arrangement is adapted to provide sensor information for one preceding target vehicle and surrounding target vehicles separate from the preceding target vehicle. The control unit arrangement is adapted to control an ego vehicle speed in dependence of the sensor information associated with the preceding target vehicle such that an ego distance between the ego vehicle and the preceding target vehicle is obtained. A time gap is defined as the time for travelling the ego distance at the ego vehicle speed. The control unit arrangement is adapted to control the ego vehicle speed in dependence of the sensor information associated with the surrounding target vehicles such that a present time gap is maintained in dependence of the number of detected surrounding target vehicles.

This means that the inventor has become aware of the fact that the number of surrounding target vehicles is the key to mimic human behavior by setting the time gap to the preceding vehicle in dependence of the number of detected surrounding target vehicles.

According to some aspects, the control unit arrangement is adapted to control the ego vehicle speed such that the time gap is decreased with an increased number of detected surrounding target vehicles, and such that the time gap is increased with a decreased number of surrounding detected target vehicles.

This means that when the number of surrounding target vehicles increases, the time gap is decreased, and the inventor has become aware of the fact that this behavior mimics human behavior. When the number of surrounding target vehicles increases, a driver tends to decrease the time gap to the vehicle in front of the vehicle.

This also means that when the number of surrounding target vehicles decreases, the time gap is increased, and, correspondingly, the inventor has become aware of the fact that this behavior mimics human behavior. When the number of surrounding target vehicles decreases, a driver tends to increase the time gap to the vehicle in front of the vehicle.

According to some aspects, the ego distance is decreased when the time gap is decreased, and the ego distance is increased when the time gap is increased.

According to some aspects, the control unit arrangement is adapted to control the time gap in dependence of the ego vehicle speed when the number of detected surrounding target vehicles is constant such that the time gap is decreased with an increased ego vehicle speed and such that the time gap is increased with a decreased ego vehicle speed.

This provides further advantages by providing control of the time gap in a manner that mimics human behavior also in the case where the number of detected surrounding target vehicles is constant.

According to some aspects, the ego distance is increased when the time gap is decreased, and the ego distance is decreased when the time gap is increased.

According to some aspects, the sensor information is provided by means of at least one of radar sensors, Lidar sensors, ultrasonic sensors, camera devices, V2V, vehicle-to-vehicle, devices and V2X, vehicle-to-anything, devices.

This means that a variety of sensor arrangement types can be applied.

According to some aspects, the control unit arrangement is adapted to run an automatic time gap algorithm that comprises a 2D look-up table from which first time gap values are output.

The time gap values relate to the preceding target vehicle and are determined by the time gap algorithm in dependence of an input number of surrounding objects and an input ego vehicle speed.

This means that the present disclosure can be realized in an uncomplicated and reliable manner, not requiring machine-learning or other complicated features.

According to some aspects, the 2D look-up table is supplemented with a dynamic adjustment algorithm where on-line values are calculated dynamically, and the resulting values are used to adjust the off-line first time gap values to adjust for actual traffic conditions.

This provides an enhanced functionality where actual traffic conditions are taken into account.

According to some aspects, the control unit arrangement is adapted to control the ego vehicle speed within certain limits, in dependence of any one of time to collision (TTC) data, the ego vehicle speed falling below a certain threshold value, overtaking and automatic lane changes.

In this manner, cases where the present disclosure is not suitable or applicable are excluded.

There are also disclosed herein methods associated with the above-mentioned advantages.

BRIEF DESCRIPTION OF THE DRAWINGS

The present disclosure will now be described more in detail with reference to the appended drawings, where.

DETAILED DESCRIPTION

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 1:
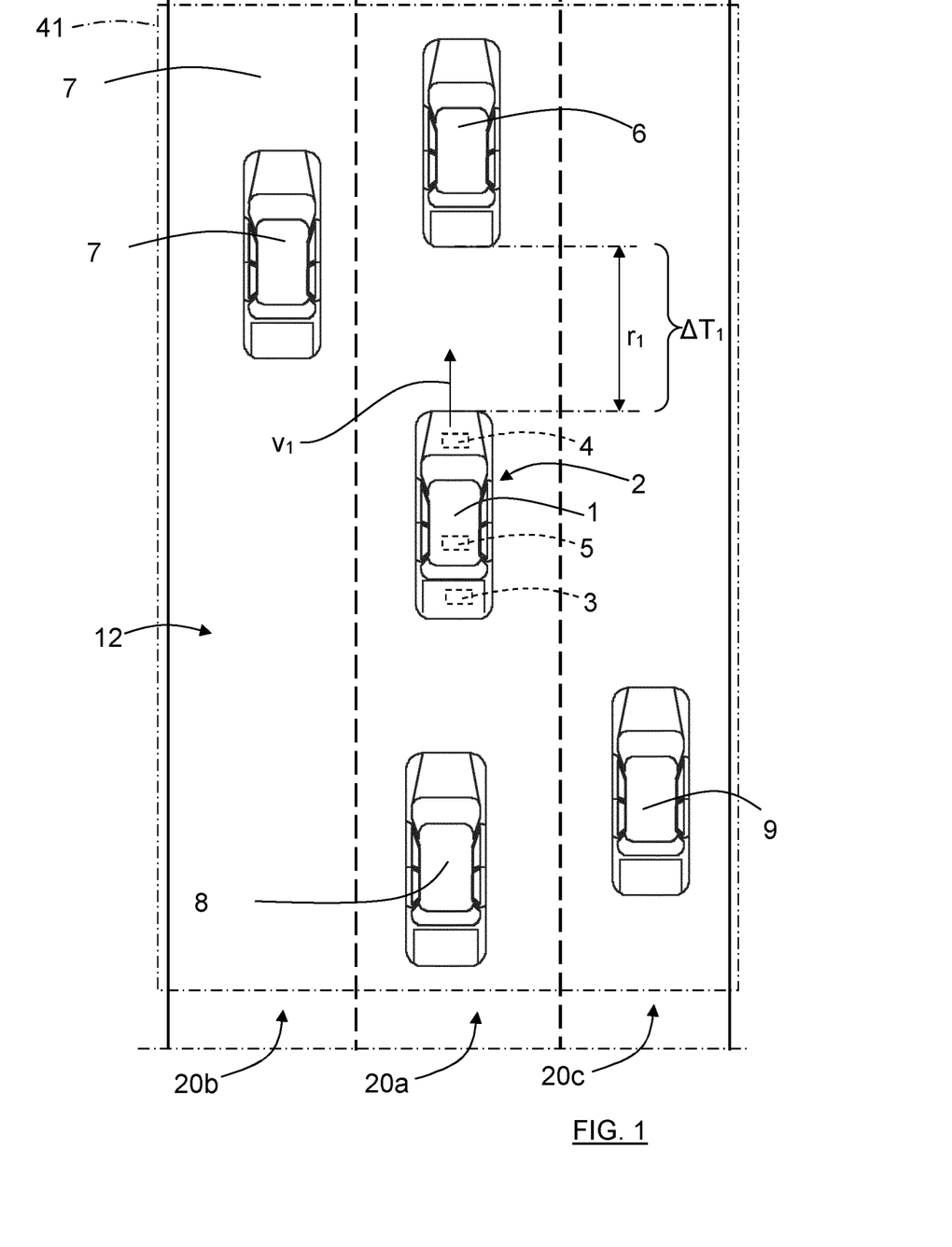
FIG. 1 shows a schematic top view of an ego vehicle in a first traffic situation.

With reference to FIG. 1, illustrating a first example, there is a road 12 with three adjacent lanes 20a, 20b, 20c, a first lane 20a, a second lane 20b and a third lane 20c. An ego vehicle 1 is travelling in the second lane 20b, following a preceding target vehicle 6. In this example, the vehicles in the lanes 20a, 20b, 20c are travelling in the same direction.

There is a vehicle control system 2 comprising a control unit arrangement 3 and at least one sensor arrangement 4, 5 that is arranged to be mounted in the ego vehicle 1 and is adapted to provide sensor information for the preceding target vehicle 6 and surrounding target vehicles 7, 8, 9, 10, 11 separate from the preceding target vehicle 6. In FIG. 1, the surrounding target vehicles 7, 8, 9, 10, 11 travel in all lanes 20a, 20b, 20c, and as will be apparent from some of the examples, the surrounding target vehicles travel in at least one of the lanes 20a, 20b, 20c.

The vehicles which are determined to constitute surrounding target vehicles 7, 8, 9, 10, 11 fulfill certain conditions, for example being positioned at a certain distance or distances from the ego vehicle 1, or being within a certain zone 41 around the ego vehicle 1, only schematically indicated in FIG. 1. The vehicles which are determined to constitute surrounding target vehicles 7, 8, 9, 10, 11 can alternatively fulfill certain conditions with respect to the preceding target vehicle 6 instead of the ego vehicle 1.

According to some aspects, the sensor information can be in the form of sensor detection, and the sensor information is provided by means of the sensor arrangement 4, 5. The sensor arrangement 4, 5 comprises at least one of radar sensors, Lidar sensors, ultrasonic sensors, camera devices, V2V, vehicle-to-vehicle, devices and V2X, vehicle-to-anything, devices.

The control unit arrangement 3 is adapted to control an ego vehicle speed $v_1$ in dependence of the sensor information associated with the preceding target vehicle 6 such that an ego distance $r_1$ between the ego vehicle 1 and the preceding target vehicle 6 is obtained. A time gap $\Delta T_1$ is defined as the time for travelling the ego distance $r_1$ at the ego vehicle speed $v_1$. This means that during the time of the time gap $\Delta T_1$, the ego vehicle travelling at the ego vehicle speed $v_1$ will travel the ego distance $r_1$.

According to the present disclosure, the control unit arrangement 8 is adapted to control the ego vehicle speed $v_1$ in dependence of the sensor information associated with the surrounding target vehicles 7, 8, 9, 10, 11 such that a present time gap $\Delta T_1$ is maintained in dependence of the number of detected surrounding target vehicles 11. In the first example, there is a first time gap $\Delta T_1$, a first ego distance $r_1$ and a first vehicle speed $v_1$ as illustrated in FIG. 1. In the following at least one of the first time gap $\Delta T_1$, the first ego distance $r_1$ and the first vehicle speed $v_1$ will be further modified.

Figure 2:
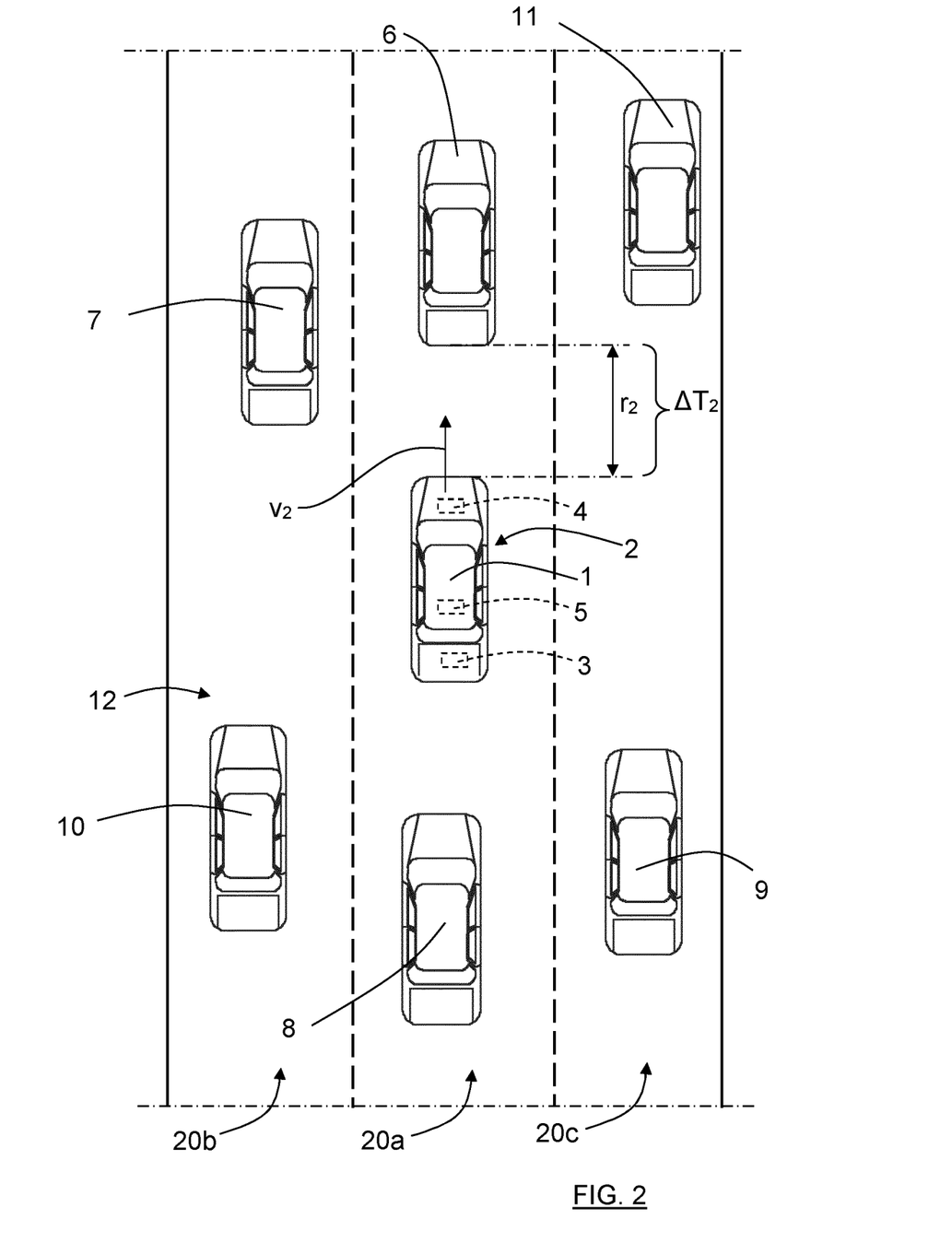
FIG. 2 shows a schematic top view of an ego vehicle in a second traffic situation.

According to some aspects, as shown in FIG. 2 that illustrates a second example, the control unit arrangement 8 is adapted to control the ego vehicle speed $v_2$ such that the time gap $\Delta T_2$ is decreased with an increased number of detected surrounding target vehicles 7, 8, 9, 10, 11. In the second example, there is a second time gap $\Delta T_2$, a second ego distance $r_2$ and a second vehicle speed $v_2$ as illustrated in FIG. 2. The vehicle speed, for example the first vehicle speed $v_1$, is thus controlled to be changed to the second vehicle speed $v_2$ such that a decreased second time gap $\Delta T_2$ is obtained when the number of detected surrounding target vehicles 7, 8, 9, 10, 11 has increased, for example compared to the first example.

This means that when the number of surrounding target vehicles 7, 8, 9, 10, 11 increases, the time gap is decreased, and the inventor has become aware of the fact that this behavior mimics human behavior. When the number of surrounding target vehicles 7, 8, 9, 10, 11 increases, a driver tends to decrease the time gap to the vehicle in front of the vehicle.

Figure 3:
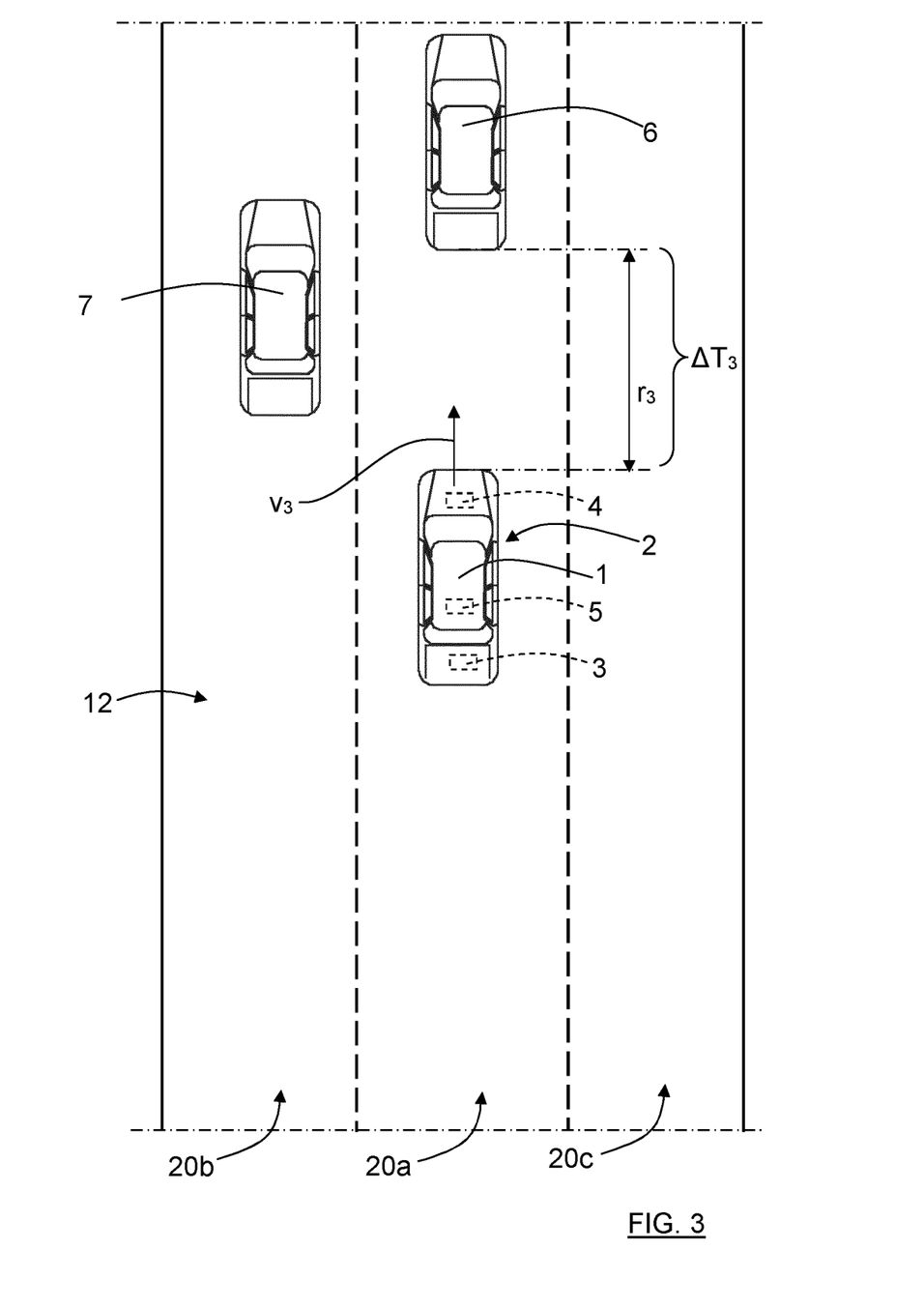
FIG. 3 shows a schematic top view of an ego vehicle in a third traffic situation.

According to some aspects, as shown in FIG. 3 that illustrates a third example, the control unit arrangement 8 is adapted to control the ego vehicle speed $v_3$ such that the time gap $\Delta T_3$ is increased with a decreased number of surrounding detected target vehicles 7. In the third example, there is a third time gap $\Delta T_3$, a third ego distance $r_3$ and a third vehicle speed $v_3$ as illustrated in FIG. 3. The vehicle speed, for example the first vehicle speed $v_1$, is thus controlled to be changed to the third vehicle speed $v_3$ such that an increased third time gap $\Delta T_3$ is obtained when the number of detected surrounding target vehicles 7 has increased, for example compared to the first example.

This means that when the number of surrounding target vehicles 7, 8, 9, 10, 11 decreases, the time gap is increased, and, correspondingly, the inventor has become aware of the fact that this behavior mimics human behavior. When the number of surrounding target vehicles 7, 8, 9, 10, 11 decreases, a driver tends to increase the time gap to the vehicle in front of the vehicle.

According to some aspects, the ego distance $r_2$ is decreased when the time gap $\Delta T_2$ is decreased, and the ego distance $r_3$ is increased when the time gap $\Delta T_3$ is increased. In the above examples, when starting from the first example, this means that the first ego distance $r_1$ is decreased to the second ego distance $r_2$ when the first time gap $\Delta T_1$ is decreased to the second time gap $\Delta T_2$. Alternatively, the first ego distance $r_1$ is increased to the third ego distance $r_3$ when the first time gap $\Delta T_1$ is increased to the third time gap $\Delta T_3$. This means that the second ego distance $r_2$ falls below the third ego distance $r_3$ and the previous ego distance, here the first ego distance $r_1$. The third ego distance $r_3$ exceeds the previous ego distance, here the first ego distance $r_1$.

Figure 4:
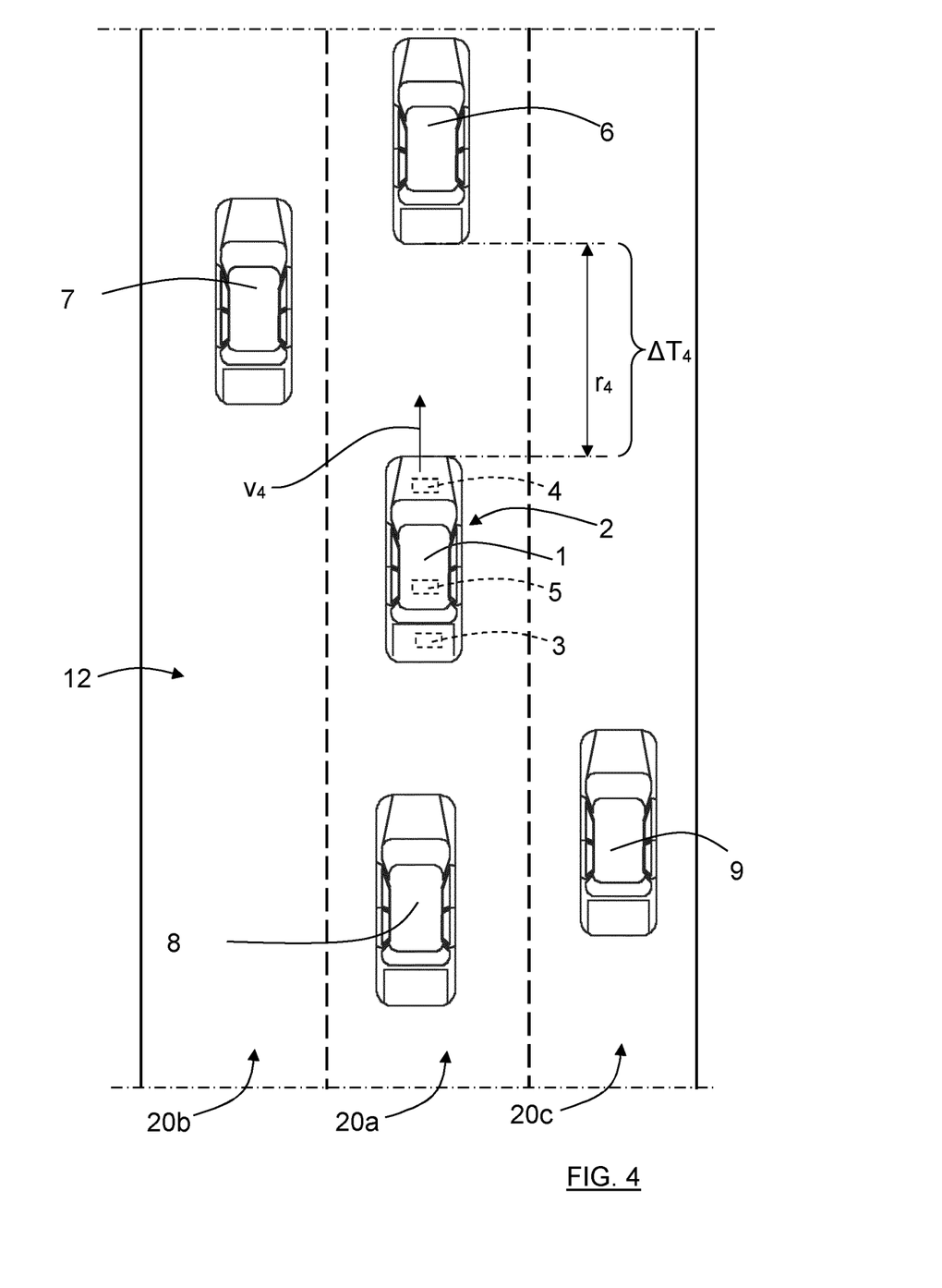
FIG. 4 shows a schematic top view of an ego vehicle in a fourth traffic situation.

According to some aspects, as shown in FIG. 4 that illustrates a fourth example, the control unit arrangement 8 is adapted to control the time gap $\Delta T_4$ in dependence of the ego vehicle speed $v_4$ when the number of detected surrounding target vehicles 7, 8, 9 is constant such that the time gap $\Delta T_4$ is decreased with an increased ego vehicle speed $v_4$. In the fourth example, there is a fourth time gap $\Delta T_4$, a fourth ego distance $r_4$ and a fourth vehicle speed $v_4$ as illustrated in FIG. 4. The time gap, for example the first time gap $\Delta T_1$, is thus controlled to be changed to the decreased fourth time gap $\Delta T_4$, and the vehicle speed, for example the first vehicle speed $v_1$, is controlled to be changed to the increased fourth vehicle speed $v_4$. A decreased fourth time gap $\Delta T_4$ and an increased fourth vehicle speed $v_4$ are thus obtained compared to the first example when the number of detected surrounding target vehicles 7, 8, 9 is constant.

Figure 5:
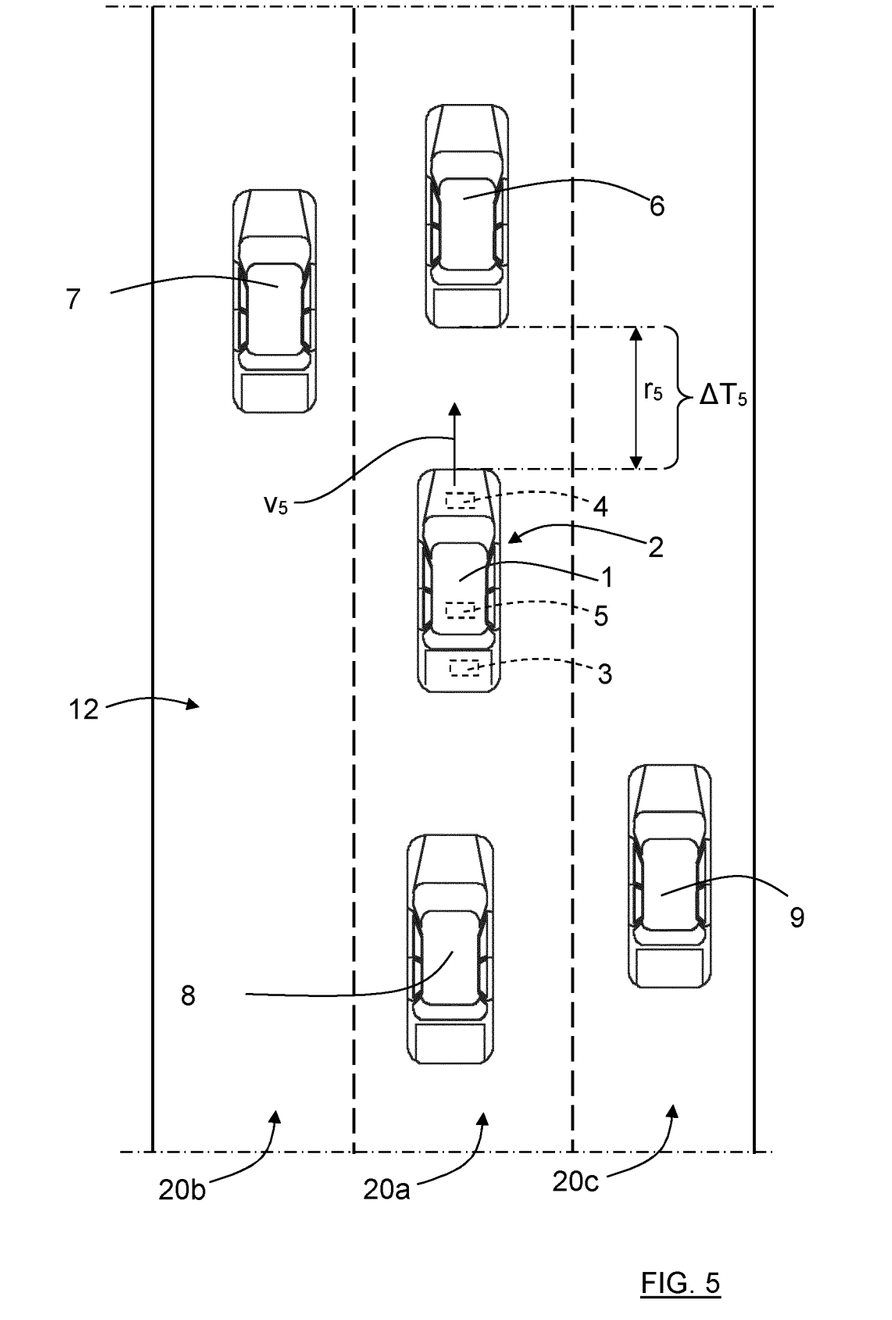
FIG. 5 shows a schematic top view of an ego vehicle in a fifth traffic situation.

According to some aspects, as shown in FIG. 5 that illustrates a fifth example, the control unit arrangement 8 is adapted to control the time gap $\Delta T_5$ in dependence of the ego vehicle speed $v_5$ when the number of detected surrounding target vehicles 7, 8, 9 is constant such that the time gap $\Delta T_5$ is increased with a decreased ego vehicle speed $v_5$. In the fifth example, there is a fifth time gap $\Delta T_5$, a fifth ego distance $r_5$ and a fifth vehicle speed $v_5$ as illustrated in FIG. 5. The time gap, for example the first time gap $\Delta T_1$, is thus controlled to be changed to the increased fifth time gap $\Delta T_5$, and the vehicle speed, for example the first vehicle speed $v_1$, is controlled to be changed to the decreased fifth vehicle speed $v_5$. An increased fifth time gap $\Delta T_5$ and a decreased fifth vehicle speed $v_5$ are thus obtained compared to the first example when the number of detected surrounding target vehicles 7, 8, 9 is constant.

In this manner, control of the time gap is provided in a manner that mimics human behavior also in the case where the number of detected surrounding target vehicles is constant.

According to some aspects, the ego distance $r_4$ is increased when the time gap $\Delta T_4$ is decreased, and the ego distance $r_5$ is decreased when the time gap $\Delta T_5$ is increased.

In the above fourth and fifth examples, when starting from the first example, this means that the first ego distance $r_1$ is increased to the fourth ego distance $r_4$ when the first time gap $\Delta T_1$ is decreased to the fourth time gap $\Delta T_4$. Alternatively, first ego distance $r_1$ is decreased to the fifth ego distance $r_5$ when the first time gap $\Delta T_1$ increased to the fifth time gap $\Delta T_5$. This means that the fourth ego distance $r_4$ exceeds the fourth ego distance $r_4$ and the previous ego distance, here the first ego distance $r_1$.

The present disclosure thus utilizes a calculation of a desired distance based on sensor information and is not dependent on a priori, static optimization/tuning which is the common solution today. The sensor information comprises the number of fused objects surrounding the host vehicle, where a fused object for example is an object that is classified as a truck, a car or a motorcycle where the states are confirmed with high confidence. The number of fused objects can according to some aspects be determined by means of a fused object counter as will be discussed later with reference to FIG. 7.

According to some aspects, an increased scenario ego vehicle speed leads to higher distance and lower time gap, and an increased number of fused objects around the host vehicle, in particular constituted by surrounding target vehicles 7, 8, 9, 10, 11, for a given speed, leads to lower ego distance and lower time gap.

The time gap increases exponentially for speeds below 5-10 m/s. Thus, the time gap is a more useful property for distance control in ACC at higher ego vehicle speeds. Therefore, according to some aspects, for lower speeds such as for example below 5-10 m/s, use distance as controller state, for higher speeds use time gap.

By means of the present disclosure, an uncomplicated and intuitive automatic time gap (ATG) function is obtained, improving the experience for the average/casual ACC user.

According to some aspects, the comfort level experienced by a user in view of the ego distance depend on the actual scenario, where more surrounding target vehicles leads to a shorter ego distance, and where a higher host speed leads to a longer ego distance. It shall be noted that a longer ego distance does not necessarily lead to an increased time gap.

In the examples presented there are first to fifth ego vehicle speed, time gap and ego distance, where the numbering relates to the different scenarios and not to a special order. A changed vehicle speed, time gap and/or ego distance can be changed from any previous scenario, and even from an initial scenario or other scenario that is not comprised in the scenarios described.

Figure 6:
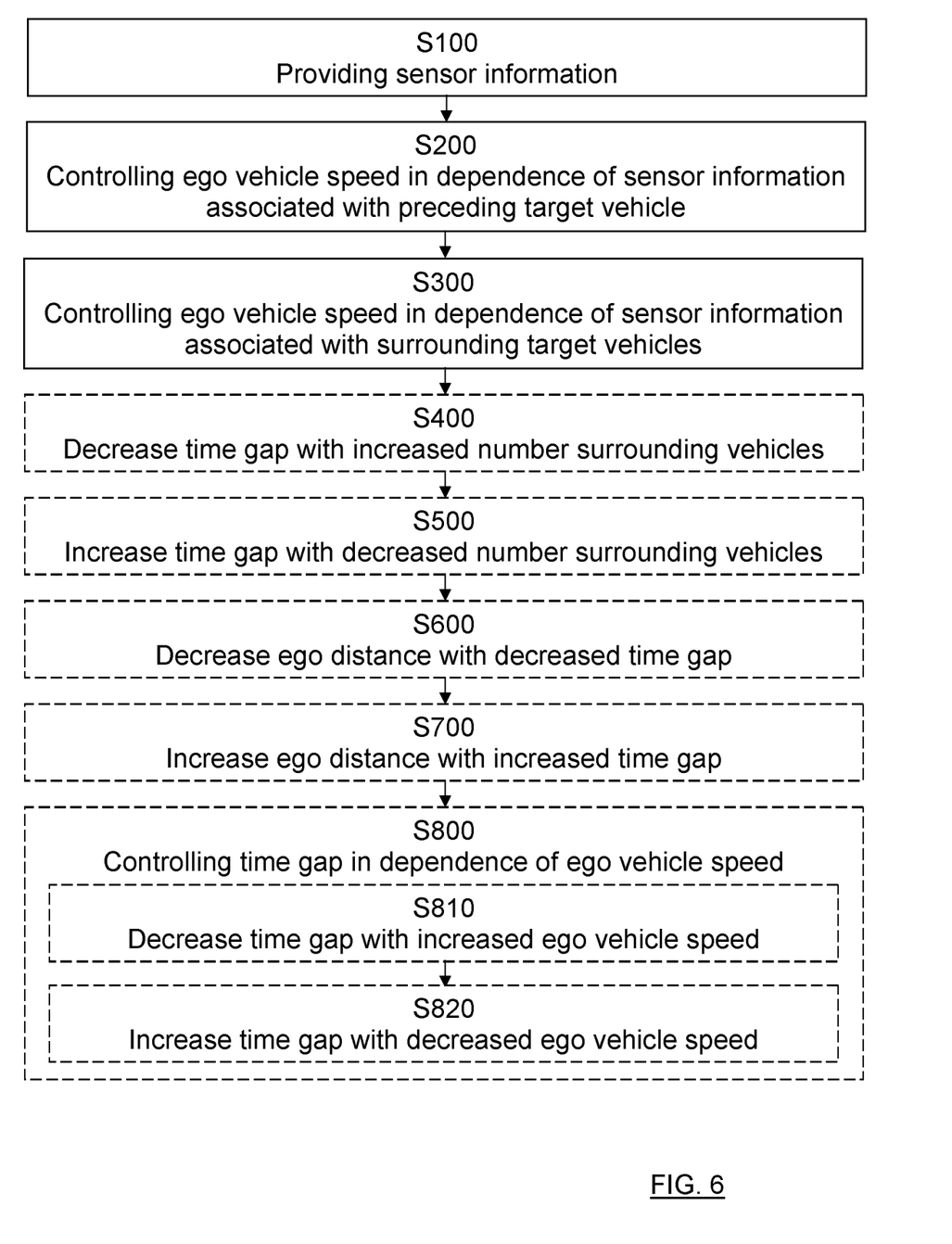
FIG. 6 shows a flowchart for methods according to the present disclosure.

With reference to FIG. 6, the present disclosure also relates to a method in a vehicle control system 2 that comprises a control unit arrangement 3 and at least one sensor arrangement 4, 5. The method comprises providing S100 sensor information for one preceding target vehicle 6 and surrounding target vehicles 7, 8, 9, 10, 11 separate from the preceding target vehicle 6, and controlling S200 an ego vehicle speed $v_1$ in dependence of the sensor information associated with the preceding target vehicle 6 such that an ego distance $r_1$ between the ego vehicle 1 and the preceding target vehicle 6 obtained. A time gap $\Delta T_1$ is defined as the time for travelling the ego distance at the ego vehicle speed $v_1$. The method further comprises controlling S300 the ego vehicle speed $v_1$ in dependence of the sensor information associated with the surrounding target vehicles 7, 8, 9, 10, 11 such that a present time gap $\Delta T_1$ is maintained in dependence of the number of detected surrounding target vehicles 11.

According to some aspects, the method comprises controlling S400 the ego vehicle speed $v_2$ such that the time gap $\Delta T_2$ is decreased with an increased number of detected surrounding target vehicles 7, 8, 9, 10, 11, and controlling S500 the ego vehicle speed $v_3$ such that the time gap $\Delta T_3$ is increased with a decreased number of surrounding detected target vehicles 7.

According to some aspects, the method comprises decreasing S600 the ego distance $r_2$ when the time gap $\Delta T_2$ is decreased, and increasing S700 the ego distance $r_3$ when the time gap $\Delta T_3$ is increased.

According to some aspects, the method comprises controlling S800 the time gap $\Delta T_4$, $\Delta T_5$ in dependence of the ego vehicle speed $v_4$, $v_5$ when the number of detected surrounding target vehicles 7, 8, 9 is constant. This is enabled by means of the method that further comprises decreasing S810 the time gap $\Delta T_4$ with an increased ego vehicle speed $v_4$ and increasing S820 the time gap $\Delta T_5$ with a decreased ego vehicle speed $v_5$.

According to some aspects, the method comprises increasing the ego distance $r_4$ when the time gap $\Delta T_4$ is decreased, and decreasing the ego distance $r_5$ when the time gap $\Delta T_5$ is increased.

The method above is described in steps that can be taken in any suitable manner in order to obtain the desired result according to the present disclosure.

The present disclosure relies on an objective analysis of the surroundings, and not on a subjective distance calibration. The present disclosure relies on an uncomplicated setup, and does not require machine-learning or other complicated features.

Figure 7:
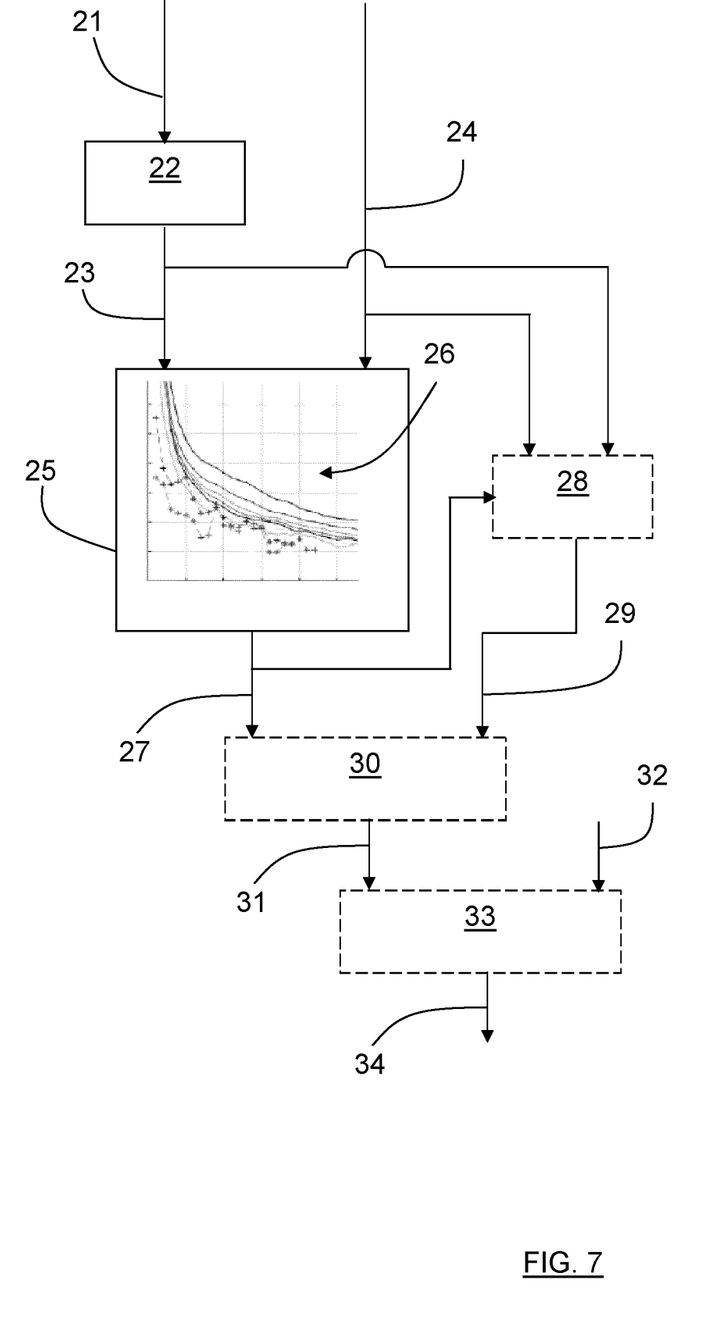
FIG. 7 illustrates a setup according to some aspects of the present disclosure.

This is for example illustrated in FIG. 7 that schematically discloses an illustration of a setup according to some aspects of the present disclosure. Information 21 related to surrounding traffic is provided by the sensor arrangement 4, 5 and is input to a fused object counter 22, and the number of surrounding objects 23 is output from the fused object counter 22. The number of surrounding objects 23 and the ego vehicle speed 24 are input into an automatic time gap algorithm 25 that comprises a 2D look-up table 26 from which first time gap values 27 are output, where the time gap values 27 relate to the preceding target vehicle 6 according to the above and are determined by the time gap algorithm 25 in dependence of the input number of surrounding objects 23 and the input ego vehicle speed 24. With the relevant inputs, the 2D look-up table 26 can be used for determining a desired ego distance, time gap and ego vehicle speed.

The 2D look-up table 26 can for example be derived by first obtaining off-line data values that form a relatively large data set. This data set is analyzed and the distances between objects are calculated.

According to some further aspects, and as indicated with dashed boxes 28, 30 in FIG. 7, the 2D look-up table is supplemented with a dynamic adjustment algorithm 28 where on-line values are calculated dynamically. These resulting values 29 are used to adjust the off-line first time gap values 27 to adjust for actual traffic conditions. The principle for this calculation is that the dynamic adjustment algorithm 28 uses the number of surrounding objects 23 and the ego vehicle speed 24 as input as well as the off-line first time gap values 27. This enables the dynamic adjustment algorithm 28 to perform real-time calculation of a difference between the off-line first time gap values 27 and the actual distances. This difference 29, a single value, is then stored and input to an adjustment arrangement 30 together with the off-line first time gap values 27 such that adjusted second time gap values 31 are output from the adjustment arrangement 30.

According to some aspects, the control unit arrangement 8 is adapted to control the ego vehicle speed within certain limits, for example additionally in dependence at least one of time to collision (TTC) data, the ego vehicle speed falling below a certain threshold value, and other functions such as overtaking and automatic lane changes.

Therefore, according to some further aspects, for relatively low speeds down to complete standstill, the automatic time gap algorithm 25 has to be disabled and a separate distance calculation has to be active. This is to ensure a consistent stop distance that is defined in absolute distance, and not in time-distance that corresponds to a time gap. Correspondingly, the automatic time gap algorithm 25 can according to some aspects also be disabled for special cases/modes like ACC Overtake, Lane change Assist, driver override etc.

Furthermore, user settings like Drive Mode, ECO ACC and ACC environmental conditions can also impact on the desired time gap apart from the automatic time gap calculation. All of this encapsulation, disabling or modification of the algorithm output is handled by an arbitrator arrangement 33 that is indicated with dashed lines in FIG. 7. The adjusted second time gap values 31 and arbitration time gap values 32 are input into the arbitrator arrangement 33, and calculated third time gap values 34 are output as final results.

According to some aspects, all necessary input data are available from an existing vehicle system, such as an ADAS system.

Figure 8:
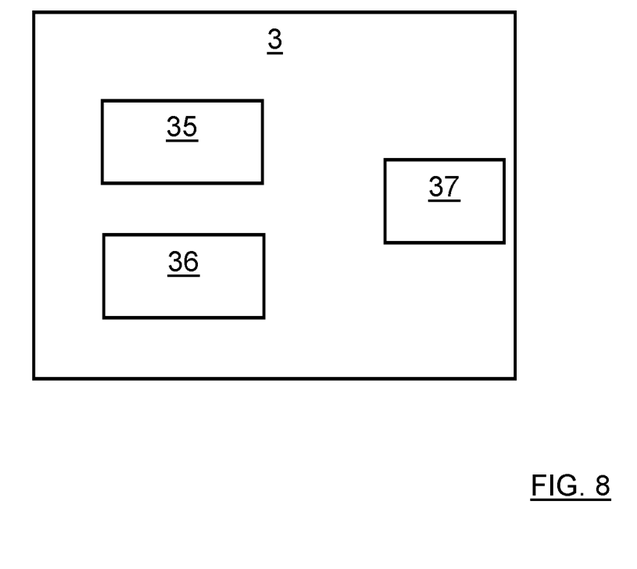
FIG. 8 schematically illustrates a control unit arrangement.

FIG. 8 schematically illustrates a control unit arrangement 3 according to aspects of the present disclosure. It is appreciated that the above described methods and techniques may be realized in hardware. This hardware is then arranged to perform the methods, whereby the same advantages and effects are obtained as have been discussed above.

Processing circuitry 35 is provided using any combination of one or more of a suitable central processing unit (CPU), multiprocessor, microcontroller, digital signal processor (DSP), etc., capable of executing software instructions stored in a computer program product, e.g. in the form of a storage medium 36. The processing circuitry 35 may further be provided as at least one application specific integrated circuit (ASIC), or field programmable gate array (FPGA).

Particularly, the processing circuitry 35 is configured to cause the control unit arrangement 3 to perform a set of operations, or steps, for example the methods described above. For example, the storage medium 36 may store the set of operations, and the processing circuitry 35 may be configured to retrieve the set of operations from the storage medium 36 to cause the control unit arrangement 3 to perform the set of operations. The set of operations may be provided as a set of executable instructions.

Thus, the processing circuitry 35 is thereby arranged to execute methods as herein disclosed. According to some aspects, the processing circuitry 35 is arranged to execute the automatic time gap algorithm 25.

The storage medium 36 may also comprise persistent storage, which, for example, can be any single one or combination of magnetic memory, optical memory, solid state memory or even remotely mounted memory.

The control unit arrangement 3 may further comprise a communications interface 37 for communications with at least one external device. As such the communication interface 37 may comprise one or more transmitters and receivers, comprising analogue and digital components and a suitable number ports for wireline or wireless communication.

The processing circuitry 35 controls the general operation of the control unit arrangement 3, e.g. by sending data and control signals to the communication interface 37 and the storage medium 36, by receiving data and reports from the communication interface 37, and by retrieving data and instructions from the storage medium 36. Other components, as well as the related functionality, of the unit are omitted in order not to obscure the concepts presented herein.

Figure 9:
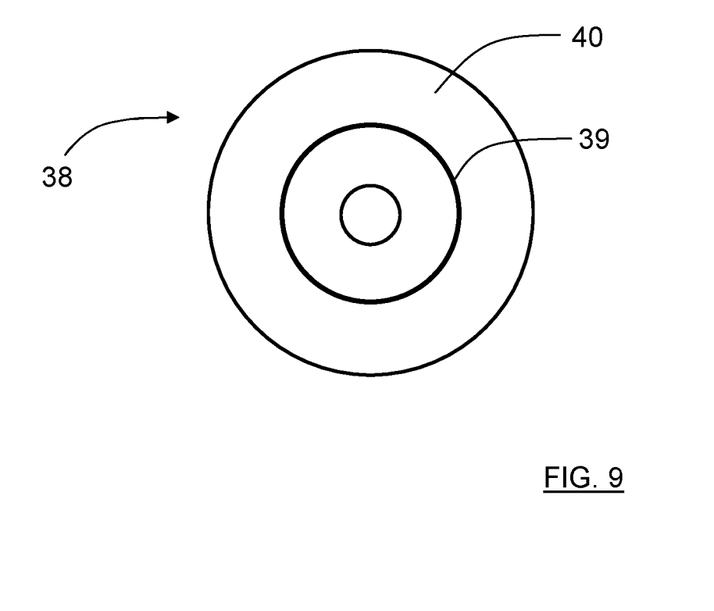
FIG. 9 shows a computer program product.

FIG. 9 schematically illustrates a computer program product 38 comprising a computer program 39 according to the disclosure above, and a computer readable storage medium 40 on which the computer program 39 is stored.

The present disclosure is not limited to the examples described above, but may vary freely within the scope of the appended claims. For example, the control unit arrangement 8 is adapted to control the ego vehicle speed in any suitable manner as is well-known in the art. The control unit arrangement 8 may comprise one control unit or several control units that are integrated or separated.

For example, all different examples provided may be combined in any suitable manner.

The present disclosure is applicable for any number of surrounding target vehicles exceeding zero.

The invention claimed is:

1. A vehicle control system comprising a control unit arrangement and at least one sensor arrangement that is arranged to be mounted in an ego vehicle, where the sensor arrangement is adapted to provide sensor information for one preceding target vehicle and surrounding target vehicles separate from the preceding target vehicle, where the control unit arrangement is adapted to control an ego vehicle speed in dependence of the sensor information associated with the preceding target vehicle such that an ego distance between the ego vehicle and the preceding target vehicle is obtained, where a time gap is defined as the time for travelling the ego distance at the ego vehicle speed, characterized in that the control unit arrangement is adapted to control the ego vehicle speed in dependence of the sensor information associated with the surrounding target vehicles such that a present time gap is maintained in dependence of the number of detected surrounding target vehicles.

2. The vehicle environment detection system according to claim 1, wherein the control unit arrangement is adapted to control the ego vehicle speed such that the time gap is decreased with an increased number of detected surrounding target vehicles, and such that the time gap is increased with a decreased number of surrounding detected target vehicles.

3. The vehicle environment detection system according to claim 2, wherein the ego distance is decreased when the time gap is decreased, and where the ego distance is increased when the time gap is increased.

4. The vehicle environment detection system according to claim 1, wherein the control unit arrangement is adapted to control the time gap in dependence of the ego vehicle speed when the number of detected surrounding target vehicles is constant such that the time gap is decreased with an increased ego vehicle speed and such that the time gap is increased with a decreased ego vehicle speed.

5. The vehicle environment detection system according to claim 4, wherein the ego distance is increased when the time gap is decreased, and where the ego distance is decreased when the time gap is increased.

6. The vehicle environment detection system according to claim 1, wherein the sensor information is provided by means of at least one of radar sensors, Lidar sensors, ultrasonic sensors, camera devices, V2V (vehicle-to-vehicle) devices, and V2X (vehicle-to-anything) devices.

7. The vehicle environment detection system according to claim 1, wherein the control unit arrangement is adapted to run an automatic time gap algorithm that comprises a 2D look-up table from which first time gap values are output, where the time gap values relate to the preceding target vehicle and are determined by the time gap algorithm in dependence of a number of surrounding objects and an ego vehicle speed.

8. The vehicle environment detection system according to claim 7, wherein the 2D look-up table is supplemented with a dynamic adjustment algorithm where on-line values are calculated dynamically, and the control unit arrangement is adapted to use the on-line values to adjust off-line first time gap values to adjust for actual traffic conditions.

9. The vehicle environment detection system according to claim 1, wherein the control unit arrangement is adapted to control the ego vehicle speed within certain limits, in dependence of any one of time to collision (TTC) data, the ego vehicle speed falling below a certain threshold value, and overtaking and automatic lane changes.

10. A method in a vehicle control system that comprises a control unit arrangement and at least one sensor arrangement, the method comprising:
    providing sensor information for one preceding target vehicle and surrounding target vehicles separate from the preceding target vehicle, and controlling an ego vehicle speed in dependence of the sensor information associated with the preceding target vehicle such that an ego distance between the ego vehicle and the preceding target vehicle obtained, where a time gap is defined as the time for travelling the ego distance at the ego vehicle speed, characterized in that the method further comprises:
    controlling the ego vehicle speed in dependence of the sensor information associated with the surrounding target vehicles such that a present time gap is maintained in dependence of the number of detected surrounding target vehicles.

11. The method according to claim 10, wherein the method comprises:
    controlling the ego vehicle speed such that the time gap is decreased with an increased number of detected surrounding target vehicles, and
    controlling the ego vehicle speed such that the time gap is increased with a decreased number of surrounding detected target vehicles.

12. The method according to claim 11, wherein the method comprises:
    decreasing the ego distance when the time gap is decreased, and
    increasing the ego distance when the time 10 gap is increased.

13. The method according to claim 10, wherein the method comprises:
    controlling the time gap in dependence of the ego vehicle speed when the number of detected surrounding target vehicles is constant by:
    decreasing the time gap with an increased ego vehicle speed and
    increasing the time gap with a decreased ego vehicle speed.

14. The method according to claim 13, wherein the method comprises:
    increasing the ego distance when the time gap is decreased, and
    decreasing the ego distance when the time gap is increased.

15. The method according to claim 10, wherein the method comprises controlling the ego vehicle speed within certain limits, in dependence of any one of time to collision (TTC) data, relatively low speeds, and overtaking and automatic lane changes.

* * * * *